US 8,228,623 B2

(12) United States Patent
Ando et al.

(10) Patent No.: US 8,228,623 B2
(45) Date of Patent: Jul. 24, 2012

(54) IMAGING DEVICE

(75) Inventors: Akira Ando, Chigasaki (JP); Toshiyuki Yokoyama, Hitachinaka (JP); Hideharu Ono, Mito (JP); Tomoaki Nishiguchi, Mito (JP); Hiroyuki Miyahara, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 4 days.

(21) Appl. No.: 13/117,175

(22) Filed: May 27, 2011

(65) Prior Publication Data

US 2011/0292525 A1 Dec. 1, 2011

(30) Foreign Application Priority Data

May 28, 2010 (JP) .................... 2010-122534

(51) Int. Cl.
 *G02B 7/02* (2006.01)
 *G03B 17/00* (2006.01)
(52) U.S. Cl. .......................... 359/820; 396/80
(58) Field of Classification Search .......... 359/820; 396/80, 97
 See application file for complete search history.

(56) References Cited

U.S. PATENT DOCUMENTS

| 5,895,129 A * | 4/1999 | Ohta ............................. 396/79 |
| 6,023,589 A | 2/2000 | Ohta |
| 2010/0092127 A1* | 4/2010 | Sasaoka et al. ................. 385/12 |

FOREIGN PATENT DOCUMENTS

JP 11-142714 5/1999

* cited by examiner

*Primary Examiner* — James Jones
(74) *Attorney, Agent, or Firm* — Antonelli, Terry, Stout & Kraus, LLP.

(57) ABSTRACT

In order to obtain stable lens positions to have an object imaged in focus when the temperature of lenses changes, an imaging device of the present invention comprises a system control section 60 having a imaging mode and a correction mode, the imaging mode in which a group of lenses 10 are controlled and moved to focusing positions for a predetermined distance at first and are further moved to correct the focusing positions for the predetermined distance to the object during imaging according to the temperature compensation data, the correction mode in which the group of lenses 10 are controlled and moved to have the temperature compensation data corrected when the temperature change is larger than or equal to a predetermined temperature difference, a correction coefficient calculation section 50 for calculating the correction coefficient to correct the temperature compensation data based on first focusing positions of the group of lenses to which the group of lenses are moved according to the temperature compensation data before corrected and second focusing positions of the group of the lenses to which the group of the lenses are automatically moved from the first focusing positions to have the object the predetermined distance away imaged in focus based on the focus evaluation value under a condition under which a moving range of the group of lenses is restricted, when the system control section is on the correction mode, a temperature compensation data correction section 51 for correcting the temperature compensation data to be used for the imaging mode based on the correction coefficient calculated by the correction coefficient calculation section.

10 Claims, 5 Drawing Sheets

Focal Lens Position Trajectory Data

Temperature Compensation Data

Focal Lens Position Trajectory Data after Temperature Compensation Data is added

IMAGING DEVICE

CROSS REFERENCE TO RELATED ART

The present patent application claims the benefit under 35 U.S.C. 119 of Japanese Patent Application No. 2010-122534 filed on May 28, 2010, the disclosure of which is incorporated into this patent application by reference.

BACKGROUND OF THE INVENTION

1. Field of the Invention

The present invention relates especially to an imaging device which is capable of correcting a deviation of an imaging plane due to a temperature change from a focal plane on which an object is in focus.

2. Description of Related Art

Such imaging devices as a monitoring camera and a camcorder operate on an auto-focus control mode (First Mode) and a manual control mode (Second Mode). There are a couple of manual control modes, a manual-focus control mode and a manual-focus trace control mode.

A focus lens is automatically moved to a focal lens position with which an object is in focus on the imaging plane when the imaging device is on the auto-focus control mode. The focus lens is manually moved by an operator to the focal position when the imaging device is on the manual-focus control mode. The focus lens is automatically moved to have the object continually imaged in focus on an imaging plane as a zoom lens is manually moved by the operator, when the imaging device is on the manual-focus trace mode.

It is necessary to move the focus lens to an accurate focal position with which the object is imaged in focus on the zoom lens being moved, when the imaging device is on the manual-focus trace mode. For this purpose, focal lens position trajectory data, which indicates the focus lens position with respect to the zoom lens position, are used in the manual-focus trace control mode.

With reference to FIG. 4, the focal lens position trajectory data are explained. FIG. 4 shows a graph indicating the focal lens position trajectory data. The horizontal axis of FIG. 4 indicates the zoom lens position while the vertical axis indicates the focal position of the focus lens. This graph indicates the focal positions of the focus lens for a constant object distance with the zoom lens position varying. A plurality of graphs corresponding to various object distances are shown for the zoom lens position on the Tele side. Every time the operator moves the zoom lens, the focus lens is automatically moved to the focal position suited for the zoom lens position according to these graphs.

On the other hand, if the temperature of the imaging device changes, a focal distance of the imaging device could change significantly due to the physical property change of a plastic material etc. used. In order to prevent the object from being imaged out of focus on the imaging plane due to the focal distance change, temperature compensation data, which are obtained in advance by measurement or calculation, are used.

FIG. 5 is a graph indicating an example of the temperature compensation data. The horizontal axis of FIG. 5 indicates the zoom lens position while the vertical axis of FIG. 5 indicates the correction distance on the focus lens position. The correction distance on the focus lens position varies between the lenses and depends on the temperature. Correcting the focal lens position trajectory data on the basis of these temperature compensation data, the focus lens can be positioned accurately at a focal position in spite of the temperature change.

JP11-142714A discloses a control method to keep an object focused on an identical plane by obtaining the correction distance on the focus lens position making use of the temperature compensation factor which is measured or calculated in advance.

However the control method disclosed by JP11-142714A utilizes temperature compensation data obtained by measurement or calculation in advance and the focus lens position obtained based on the temperature compensation data is not necessarily optimum for any of focus lenses mass-produced. Therefore there could be a possibility that the accuracy on focusing lowers.

The present invention is intended to provide an imaging device with which the focus lens is always positioned to an accurate focal position with which an object is imaged in focus, even when the temperature of the imaging device is changing.

SUMMARY OF THE INVENTION

In order to achieve the above mentioned objective, an imaging device of the present invention comprises a group of lenses, a temperature measurement section for measuring temperature information on the group of lenses, a focus evaluation value detection section for detecting a focus evaluation value to evaluate a focusing condition of the group of the lenses, a storage section for storing temperature compensation data to be used to compensate for a deviation of lens positions of the group of lenses from the lens positions of the group of lenses for having an object imaged in focus, the deviation being caused by a temperature change of the group of lenses, a system control section having a imaging mode and a correction mode, the imaging mode in which the group of lenses are controlled and moved to focusing positions for a predetermined distance to the object at first and are further moved to correct the focusing positions for the predetermined distance to the object during imaging according to the temperature compensation data, the correction mode in which the group of lenses are controlled and moved to have the temperature compensation data corrected when the temperature change is larger than or equal to a predetermined temperature difference, a correction coefficient calculation section for calculating the correction coefficient to correct the temperature compensation data based on first focusing positions of the group of lenses to which the group of lenses are moved according to the temperature compensation data before corrected and second focusing positions of the group of the lenses to which the group of the lenses are automatically moved from the first focusing positions to have the object the predetermined distance away imaged in focus based on the focus evaluation value under a condition under which a moving range of the group of lenses is restricted, when the system control section is on the correction mode, a temperature compensation data correction section for correcting the temperature compensation data to be used for the imaging mode based on the correction coefficient calculated by the correction coefficient calculation section.

DETAILED DESCRIPTION OF THE EMBODIMENTS

Hereinafter are explained embodiments of the present invention.

[Structure of Imaging Device 1]

Figure 1:
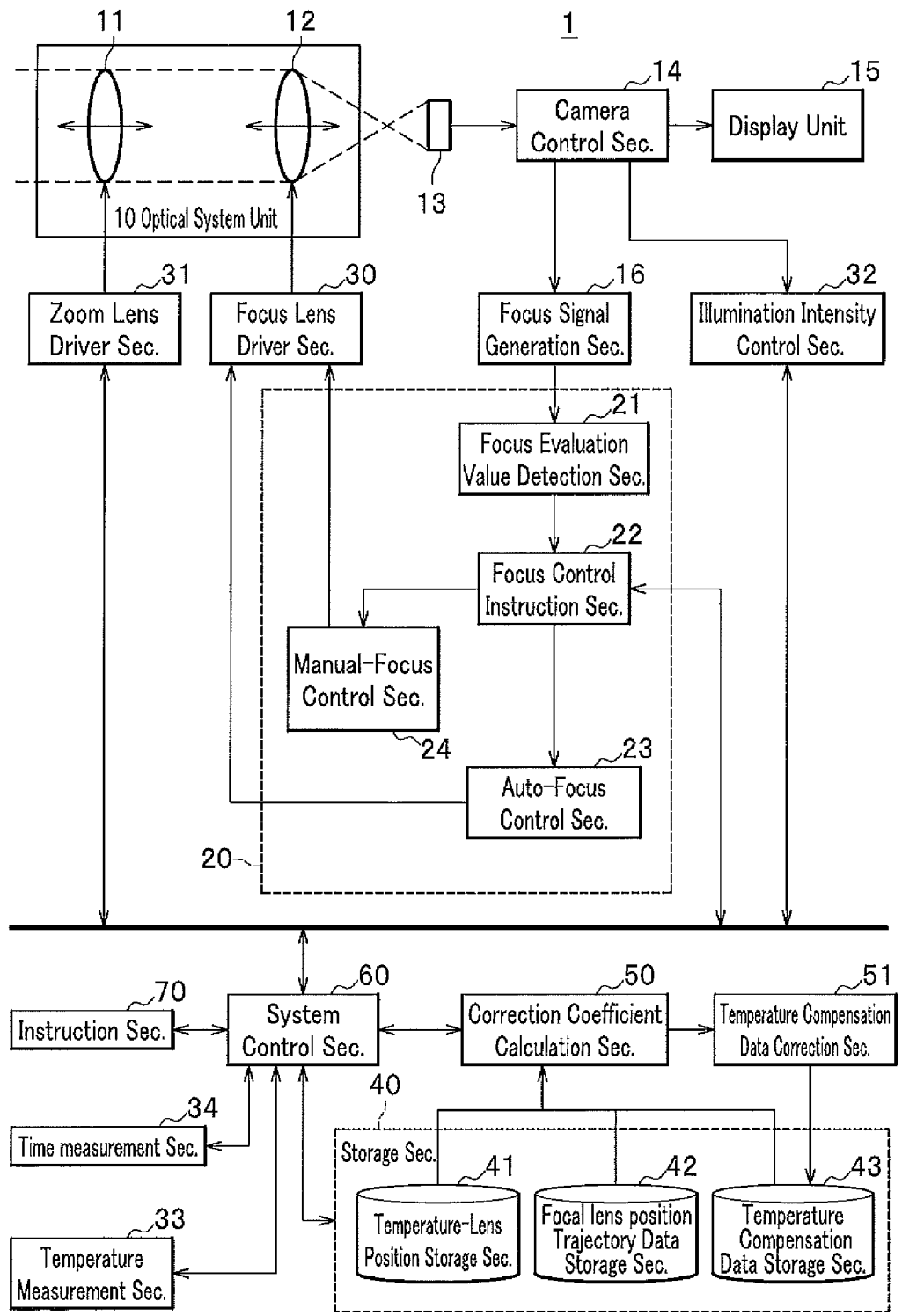
FIG. 1 is a schematic diagram showing the structure of an imaging device in accordance with the present invention.

As is shown in FIG. 1, an imaging device 1 is constituted by an optical system unit 10, an imaging element 13, a camera control section 14, a display unit 15, a focus signal generation section 16, a focus control section 20, a focus lens driver section 30, zoom lens driver section 31, a illumination intensity control section 32, a temperature measurement section 33, a time measurement section 34, a storage section 40, a correction coefficient calculation section 50, a temperature compensation data correction section 51, a system control section 60 and instruction section 70.

An object to be taken is imaged on a light receiving plane of the imaging element 13 through a zoom lens 11 and a focus lens 12 both of which belong to the optical system unit 10.

The zoom lens 11 is a lens for magnification adjustment and can be moved between a small magnification position (Wide) and a large magnification position (Tele). The focus lens 12 is a lens for focus point adjustment and can be moved to adjust a focal distance. The imaging element 13 converts photoelectrically an image imaged on the light receiving plane and outputs the converted electrical signal to the camera control section 14. The camera control section 14 has a circuit to generate a video signal from the converted electrical signal that is input from the imaging element 13 and outputs the generated video signal to the display unit 15, the focus signal generation section 16 and the illumination intensity control section 32.

The display unit 15 is a display device through which the taken image is checked. The focus signal generation section 16 extracts signal components within predetermined frequency band from a brightness signal included in the video signal input from the camera control section 14 and generate a focus signal which is in a mountain shape and becomes the maximum when the taken image is in sharp focus.

The focus control section 20 is constituted by a focus point assessment section 21, a focus control instruction section 22, an auto-focus control section 23 and manual-focus control unit 24. The focus point evaluation value detection section 21 detects as focus evaluation values a gradient level, a gradient direction and an absolute intensity level of the focus signal are generated by the focus signal generation section 16. Based these focus evaluation values can be determined the focus lens position where the taken image ought to be in focus.

The focus control instruction section 22 determines a moving direction, a moving speed and a moving range of the focus lens according to signals from the focus evaluation value detection section 21 and a system control section 60 on which an explanation is given later and outputs an instruction signal to either the auto-focus control section 23 or the manual-focus control section 24.

The auto-focus control section 23 outputs a drive signal to the focus lens driver section 30 according to the instruction sent from the focus control instruction 22 when the auto-focus control mode (First Mode) is selected The manual-focus control section 24 outputs a drive signal to the focus lens driver section 30 according to the instruction from the focus control instruction 22 when the manual-focus control mode is selected.

The focus lens driver section 30 includes a driving motor for moving the focus lens 12 and a circuit to control the driving motor and moves the focus lens 12 in response to receiving the drive signal from either the auto-focus control section 23 or the manual-focus control section 24. The zoom lens driver section 31 includes a driving motor for moving the zoom lens 11 and a circuit to control the driving motor and moves the zoom lens 11 in response to receiving the drive signal from a system control section 60 on which an explanation is given later.

The illumination intensity control section 32 generates an illumination intensity evaluation value for a brightness level of the video signal input from the camera control section 14 and outputs the illumination intensity evaluation value to the system control section 60.

The temperature measurement section 33 measures a temperature on the optical system unit 10 inclusive of the zoom lens 11 and the focus lens 12 and includes a thermistor in this embodiment.

The storage section 40 includes a temperature-lens position storage section 41, a focal lens position trajectory data storage section 42 and a temperature compensation data storage section 43 and is constituted, for instance, by volatile memories or non-volatile memories.

The temperature-lens position storage section 41 stores a current temperature measured by the temperature measurement section 33 and a lens position determined by the focus control instruction section 22.

The focal lens position trajectory data storage section 42 stores the focal lens position trajectory data already explained.

The temperature compensation data storage section 43 stores the temperature compensation data already explained.

The correction coefficient calculation section 50 calculates a correction coefficient to correct the temperature compensation data, making use of the lens position stored in the temperature-lens position storage section 41, the focal lens position trajectory data stored in the focal lens position trajectory data storage section 42 and the temperature compensation data stored in the temperature compensation data storage section 43.

The temperature compensation data correction section 51 multiplies or divides the temperature compensation data by the correction coefficient calculated by the correction coefficient calculation section 50.

The system control section 60 is a control device to control the imaging device 1, constituted by CPU, ROM, RAM, various interfaces and etc. and controls various circuits.

The instruction section 70 detects an instruction for an operator.

[Operation of Imaging Device 1]

Next is explained operation of the imaging device 1 with reference to FIG. 2 to 6.

In this embodiment, temperature compensation is performed using the auto-focus control (Third Mode, Correction Mode) under a predetermined condition, when the imaging device 1 is on the manual control mode (Second Mode, Imaging Mode).

As is mentioned earlier, the auto-focus control mode (First Mode) is a control mode in which the focus lens 12 is automatically moved to a focus lens position to have an object imaged in focus. When the manual-focus trace control (Second Mode, Imaging Mode) is effected, the focus lens 12 is automatically moved to a focus lens position to have an object imaged in focus as soon as an operator manually moves the zoom lens 11. For instance, when the operator manually performs a zoom-up or zoom-out operation after manually focusing, subsequent auto-focusing is automatically performed simultaneously and manual-focusing operation is not needed.

Figure 2:
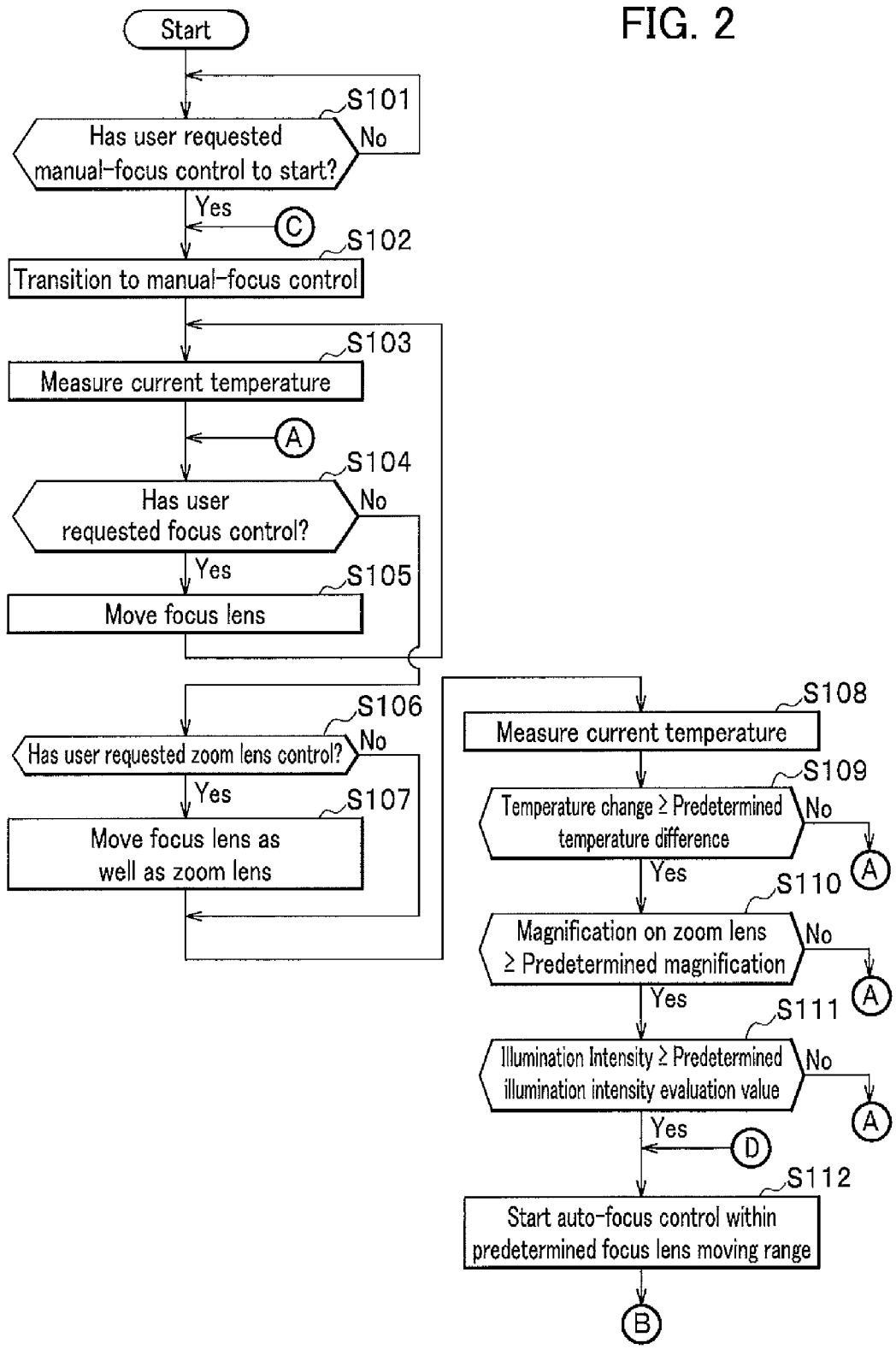
FIG. 2 is a flow chart showing the operation of the imaging device in accordance with the present invention.

As is indicated in the flowchart of FIG. 2, the system control section 60 determines at step 101 whether there is a manual-focus trace control request through the instruction section 70 by a user. If there is the manual-focus trace control request (Yes at step 101), the operation goes to step 102.

At step 102, the system control section 60 gives the focus control instruction section 22 an instruction for the manual-focus control and the focus control instruction section 22 comes to give an instruction only to the manual-focus control section 24 from now on. Then the manual-focus control gets started and the auto-focus control mode (First Mode) stops.

At step 103, the temperature measurement section 33 measures the current temperature and has the measured current temperature stored as a first temperature in the temperature-lens position storage section 41.

At step 104, the system control section 60 determines whether there is a focus control request through the instruction section 70 by the user, that is, whether the user has given the system control section 60 an instruction to have the focus lens 12 moved.

If there is a focus lens control request (Yes at step 104), the operation goes to step 105 and the focus lens driver section 30 moves the focus lens in accordance with an input signal through the focus control instruction section 22 from the instruction section 70. Next, the operation goes to step 103. This transition to step 103 occurs only after the direction to move the focus lens 12 is given. As a result of this transition, the temperature on the optical system 10 is measured before the temperature on the optical system unit 10 rises on the optical system unit 10 becoming self-heated due to the focus lens being moved. Step 104 and step 105 are performed with the imaging device 1 operating on the manual-focus control mode.

On the other hand, if there is no focus lens control request (No at step 104), the operation goes to step 106 and the system control section 60 determines whether there is a zoom control request through the instruction section 70 by the user, that is, whether the user has given the system control section 60 an instruction to have the zoom lens 11 moved.

If there is a zoom lens control request (Yes at step 106), the operation goes to step 107 and the system control section 60 adds the temperature compensation data stored in the temperature compensation data storage section 43 to the focal lens position trajectory data stored in the focal lens position trajectory data storage section 42 and output the summation to the focus control instruction section 22. Then, the focus control instruction section 22 determines the zoom lens position and the focus lens position on the basis of the summation and the zoom lens position instructed through the system control section 60 by the user. In accordance with the zoom lens position and the focus lens position that are determined, the zoom lens driver section 31 moves the zoom lens 11 to the zoom lens position that is determined and the focus lens driver section 30 moves the focus lens 12 to the focus lens position that is determined. Subsequently the operation goes to step 108. Step 106 and step 107 in this operation are in the manual-focus trace control.

On the other hand, if there is no zoom lens control request (No at step 106), the operation goes to step 108.

At step 108, the temperature measurement section 33 measures the current temperature and has the measured temperature stored as a second temperature in the temperature-lens position storage section 41.

At step 109, the system control section determines whether a temperature change between the first temperature and the second temperature, both of which are stored in the temperature-lens position storage section 41, is larger than or equal to a predetermined temperature difference. The predetermined temperature difference referred to here is appropriately set to, for instance, 10 degree centigrade, in order to determine whether it is necessary to compensate for the temperature change. If the temperature change is smaller than the predetermined temperature difference (No at step 109), the operation goes back to step 104.

If the temperature change is larger than or equal to the predetermined temperature difference (Yes at step 109), the operation goes to step 110 and the system control section 60 determines whether the magnification on the zoom lens is larger than or equal to a predetermined magnification. When the magnification is relatively small, the distance between the focus lens position for the shortest focus distance and the focus lens position for the infinity is so small that it is difficult to calculate accurately a correction coefficient that applies to all magnifications. Therefore the operation after step 112 is performed only when the magnification on the zoom lens is larger than or equal to the predetermined magnification, although it is also possible to perform the operation from step 112 when the magnification is relatively small. The predetermined magnification is set to, for instance, 18. If the magnification is smaller than the predetermined magnification (No at step 111), the operation goes back to step 104.

If the magnification on the zoom lens is larger than or equal to the predetermined magnification (Yes at step 111), the system 60 instructs the temperature-lens position storage section 41 to store the current focus lens position as a first focus lens position and gives the focus control instruction section 22 an instruction for the auto-focus control at step 112. Then the focus control instruction section 22 comes to give an instruction only to the auto-focus control section 23 from now on.

The focus control instruction section 22 restricts the moving range of the focus lens and makes the moving range smaller than the moving range in the ordinary auto-focus control mode. The reason for this restriction is to prevent the focus lens from being automatically moved to have an object that is moving imaged in focus, in order to detect a deviation of the focal position of the focus lens detected in the auto-focus control mode after the temperature changes from the first lens position. With this restriction in place, unnecessary movement of the focus lens is prevented and the focal position of the focus lens can be easily detected in the auto-focus control mode. Next, the operation goes to step 113 (See FIG. 3).

Hereinafter is explained FIG. 3.

Figure 3:
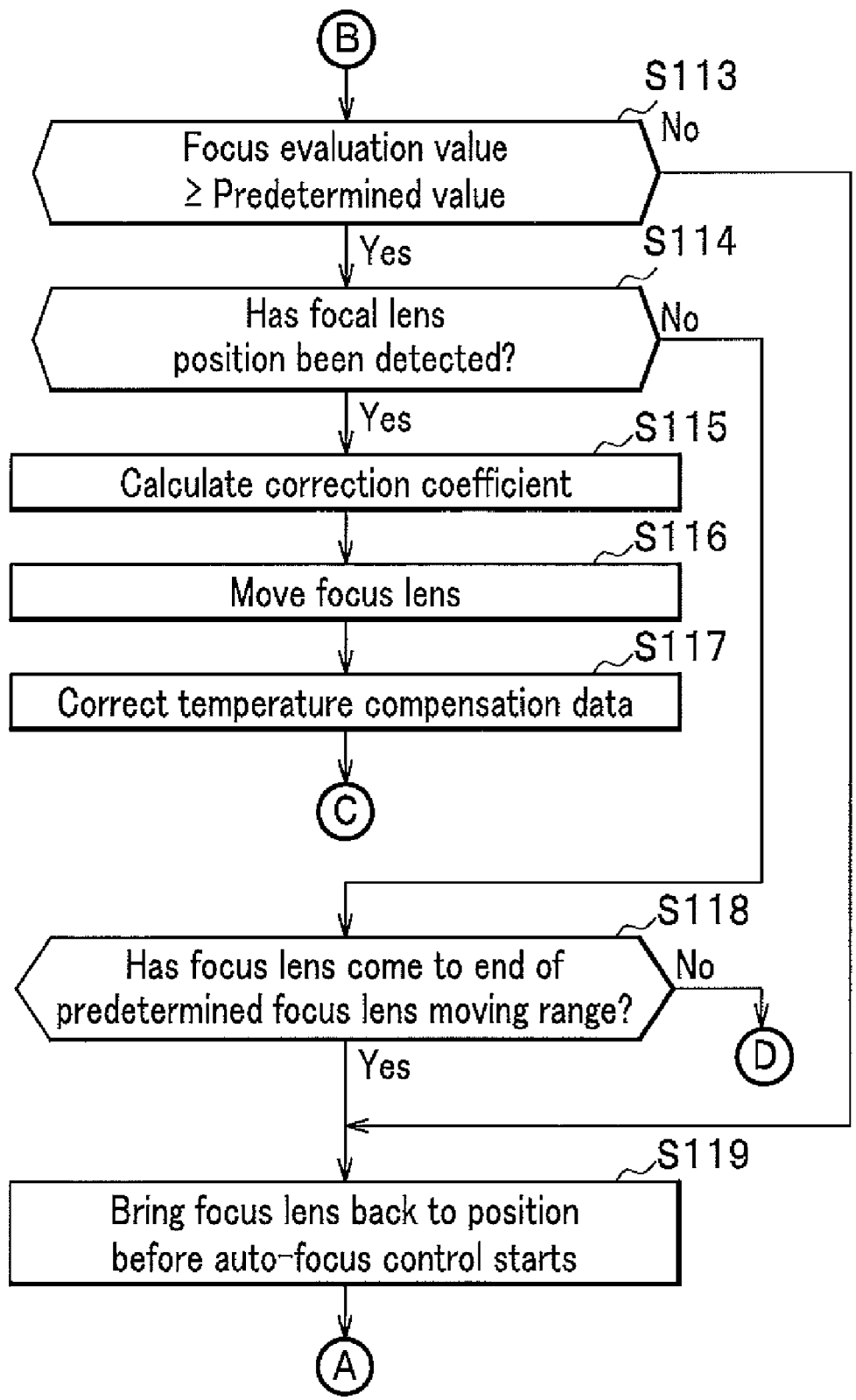
FIG. 3 is a flow chart following the flow chart in FIG. 2 and showing the operation of the imaging device in accordance with the present invention.
Figure 4:
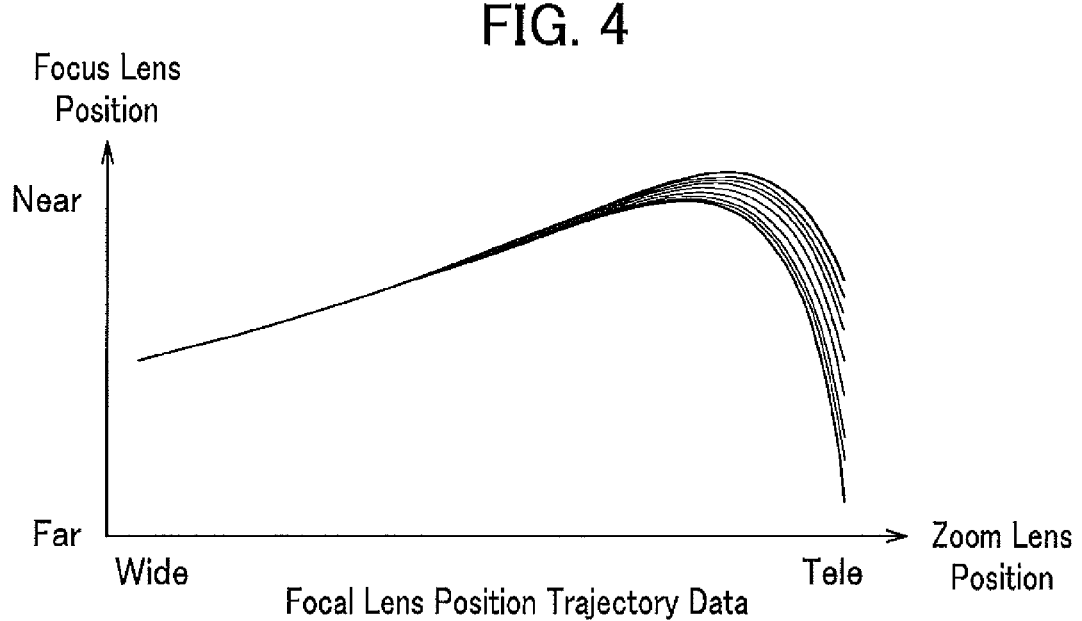
FIG. 4 is a graph indicating focal lens position trajectory data on a focus lens of a conventional imaging device.
Figure 5:
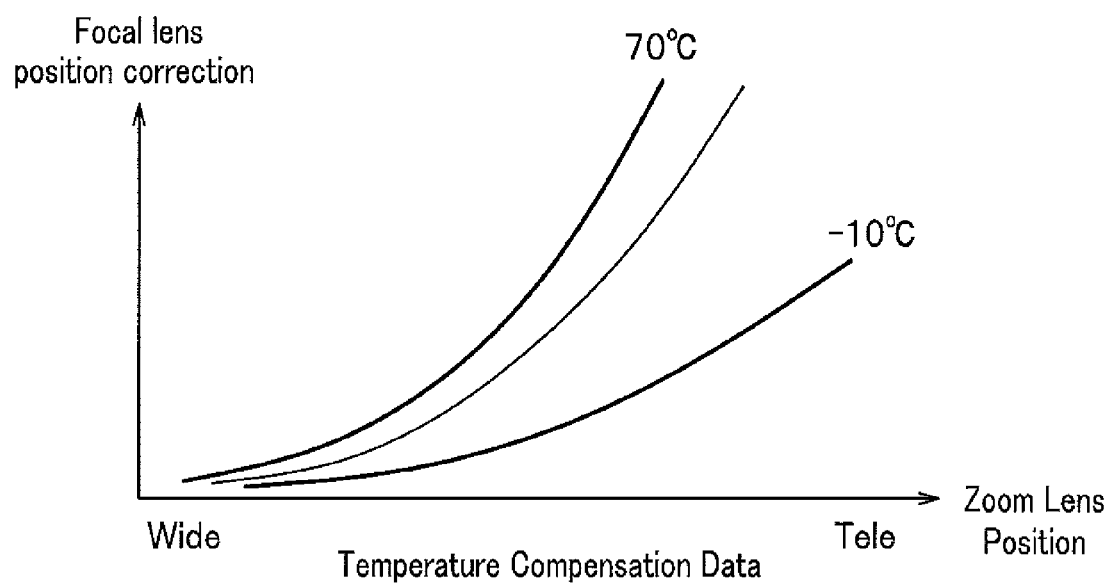
FIG. 5 is a graph indicating temperature compensation data on the focal lens position of a conventional imaging device.

As is shown in FIG. 3, the focus control instruction section 22 determines whether the focus evaluation value detected by the focus evaluation value detection section 21 is larger than or equal to a predetermined evaluation value. If the detected focus evaluation value is smaller than the predetermined evaluation value (No at step 113), the operation goes to step 119.

If the focus evaluation value is larger than or equal to the predetermined evaluation value (Yes at step 113), the focus control instruction section 22 determines whether the focal position on the focus lens 12 is detected or not. If the focal position of the focus lens is not detected (No at step 114), the operation goes to step 118.

If the focal position of the focus lens is detected (Yes at step 114), the operation goes to step 115 and the system control section 60 instructs the temperature-lens position storage section 41 to store the detected focus lens position as a second focus lens position. Then the correction coefficient calculation section 50 calculates a correction coefficient to correct the temperature compensation data based on the first focus lens position and the second focus lens position.

Next, a way to calculate the correction coefficient is explained with reference to FIG. 6.

Figure 6:
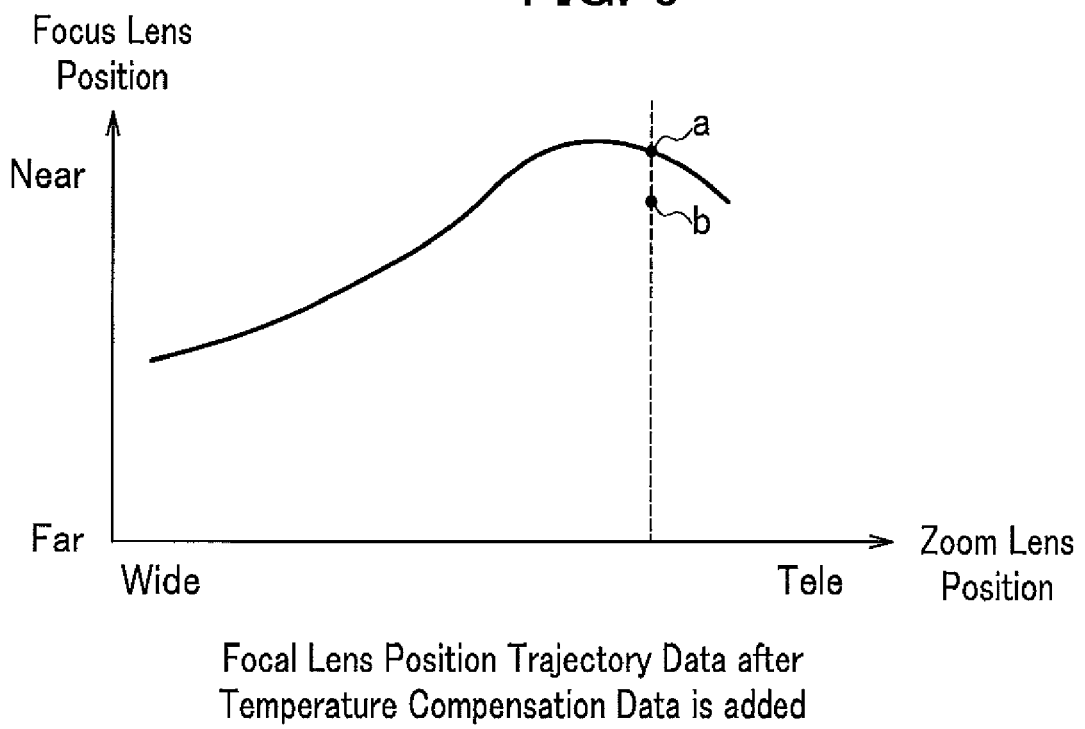
FIG. 6 is a graph indicating a way to obtain a correction coefficient for an imaging device in accordance with the present invention.

FIG. 6 is a graph indicating the result of the focal lens position trajectory data to which the default temperature compensation data (FIG. 5) is added. A point a indicates the first focus lens position which is a focus lens position before the auto-focus control gets started at step 112. A point b indicates a second focus lens position detected at step 114. The points a, b indicate that there is a shift of the focus lens position for the in-focus image after the temperature change. Obtaining a change in the temperature compensation data for a zoom lens position from the difference between the points a, b and calculating a ratio for the zoom lens position of the temperature compensation value for the point b to the default temperature compensation value for the point a, the calculated ratio is made a correction coefficient.

At step 116, the focus lens driver section 30 moves the focus lens 12 to the second focus lens position.

At step 117, the temperature compensation data correction section 51 obtains the corrected temperature compensation data for the magnification range where the correction is needed by multiplying the correction coefficient with the temperature compensation data. Subsequently, the temperature compensation data correction section 51 has the corrected temperature compensation data stored in the temperature compensation data storage section 43. Then the operation goes back to step 102. Then the focus lens position is determined with the corrected temperature compensation data in the manual-focus control or the manual-focus trace control.

At step 118, the focus control instruction section 22 determines if the focus lens has come to an end of the restricted moving range of the focus lens. If the focus lens has not come to an end of the restricted moving range (No at step 118), the operation goes back to step 112.

If the focus lens has come to an end of the restricted moving range (Yes at step 118), the focus lens is brought back to the first focus lens position.

The aforementioned operation enables taking into account a property of each lens actually mounted on each imaging device for calculating the temperature compensation data and correcting accurately the focal lens positions for each imaging device regardless of the property variation of each lens.

The present invention works especially well for the imaging device with lenses of a plastic material whose optical property varies relatively easily with its temperature changing and also for such imaging devices as a small and portable device, for instance, a camcorder Modified Embodiment An embodiment of the present invention has been described so far and the embodiment of the present invention is not limited to what has been described and may be modified to be any embodiment as long as it is within the scope of the present invention. For instance, the following modified embodiment is within the scope of the present invention.

At step 105, the operation may be transitioned to step 103 before the instruction to move the focus lens, or after the focus lens is moved.

At step 109, if the temperature change is larger than or equal to a predetermined temperature difference, the operation goes for the temperature compensation. At this step the predetermined temperature difference may be made dependent on the second temperature, because the optical property of the lens material does not necessarily change linearly with the temperature of the lens material if the optical property changes with the temperature. With this modification in place, it is possible to optimize the frequency at which correction of the focus deviation with auto-focus control and prevent the correction from being carried out too frequently, which leads to reduction of electric power to be consumed. Moreover, since the effect of image defocus is different between low magnification for which depth of field is relatively large and high magnification for which the depth of field is relatively small, the predetermined temperature difference is made to change according to the magnification on the zoom lens. With this modification in place, the same effect as above is brought about. Furthermore, the predetermined temperature difference is determined comparing the second temperature with the temperature at which adjustment was carried out during assembly.

At step 112, the restricted moving range of the focus lens is varied according to either of the temperature compensation data and the optical property of the lenses both of which are stored in the temperature compensation data storage section 43. For example, the restricted moving range may be made smaller for the magnification for which it is unlikely for the taken image to be defocused due to the temperature change. Alternatively, the restricted moving range is varied based on history information on moving instructions (for instance, moving distance and moving direction) to the focus lens and the zoom lens from the instruction section 70. In this case the history information on moving instructions must be stored in the storage section 40 in advance. With this modification in place, the position of the focus lens, whose deviation from the focal position is dependent on the moving direction and the moving distance, can be corrected to be optimum for having an image in focus.

At step 113, either one focus evaluation value or a plurality of focus evaluation values may be compared with a predetermined value. Alternatively a focus evaluation value may be a ratio between a plurality of evaluation values as the property of the mountain shape signal to be detected for the focus evaluation value varies depending on the detection frequency. Furthermore, depending on the image contrast, a choice is made between one focus evaluation and a plurality of focus evaluation values.

The temperature-lens position storage section 41 may be either a volatile memory or a non-volatile memory. If the non-volatile memory is used, the focus lens is moved from the condition after a correction on a defocused image already made as soon as a power supply is switched on, even when a power supply is switched off after the correction on the defocused image is made. Moreover, both the volatile memory and the non-volatile memory are used for a imaging device. By having stored lens positions and temperatures that are measured at a constant interval, the life of the non-volatile memory is made longer.

There is a type of a camera with a preset function to have automatically the zoom lens and the focus lens moved to the predetermined positions which are stored in a internal memory. The present invention can be applied to this type of the camera.

The wave height for moving both or either of the focus lens and the zoom lens may be made to vary between the ordinary auto-focus control mode (First Mode), the manual-focus control mode and the manual-focus trace control mode (Second Mode). For instance, the wave height may be made a maximum in the auto-focus control mode in which a lens moving velocity is large to prevent a driving motor from moving without synchronism while the correction of the lens position is under way and may be made smaller than the maximum in the auto-focus control mode in which the lens moving velocity is smaller. With this modification in place, the power consumption of the imaging device is suppressed.

The moving velocity of the focus lens 12 may be made to change between the ordinary auto-focus control mode (First Mode) and the auto-focus control mode (Third Mode) intended for the temperature compensation by moving the focus lens 12 at such a low velocity (for instance, smaller than or equal to 120 pps for pulse signals on first-second phase drive) as can not be measured on the display unit 15 in the auto-focus control mode (Third Mode) intended for the temperature compensation. Moreover, the moving distance and the moving velocity of the focus lens is changed depending on the magnification on the zoom lens in the auto-focus control for the temperature compensation (Third Mode).

Furthermore, when there is a lens moving instruction by a user, user's instruction may be followed at once at every step.

What is claimed is:

1. An imaging device comprising,
a group of lenses,
a temperature measurement section for measuring temperature information on the group of lenses,
a focus evaluation value detection section for detecting a focus evaluation value to evaluate a focusing condition of the group of the lenses,
a storage section for storing temperature compensation data to be used to compensate for a deviation of lens positions of the group of lenses from the lens positions of the group of lenses for having an object imaged in focus, the deviation being caused by a temperature change of the group of lenses,
a system control section having a imaging mode and a correction mode, the imaging mode in which the group of lenses are controlled and moved to focusing positions for a predetermined distance to the object at first and are further moved to correct the focusing positions for the predetermined distance to the object during imaging according to the temperature compensation data, the correction mode in which the group of lenses are controlled and moved to have the temperature compensation data corrected when the temperature change is larger than or equal to a predetermined temperature difference,
a correction coefficient calculation section for calculating the correction coefficient to correct the temperature compensation data based on first focusing positions of the group of lenses to which the group of lenses are moved according to the temperature compensation data before corrected and second focusing positions of the group of the lenses to which the group of the lenses are automatically moved from the first focusing positions to have the object the predetermined distance away imaged in focus based on the focus evaluation value under a condition under which a moving range of the group of lenses is restricted, when the system control section is on the correction mode, and
a temperature compensation data correction section for correcting the temperature compensation data to be used for the imaging mode based on the correction coefficient calculated by the correction coefficient calculation section.

2. An imaging device comprising,
a group of lenses,
a temperature measurement section for measuring temperature information on the group of lenses,
a focus evaluation value detection section for detecting a focus evaluation value to evaluate a focusing condition of the group of the lenses,
a storage section for storing temperature compensation data to be used to compensate for a deviation of lens positions of the group of the lenses from the lens positions of the group of lenses for having an object imaged in focus, the deviation being caused by a temperature change of the group of the lenses,
a system control section having a first control mode in which the group of lenses are controlled and automatically moved based on the focus evaluation value to have the object imaged in focus, a second control mode in which the group of lenses are controlled and moved to focusing positions for a predetermined distance to the object at first and are further moved to correct the focusing positions for the predetermined distance during imaging according to the temperature compensation data, and the third control mode in which the group of lenses are controlled and moved to have the temperature compensation data corrected when the temperature change is larger than or equal to a predetermined temperature difference,
a correction coefficient calculation section for calculating the correction coefficient to correct the temperature compensation data based on first focusing positions of the group of lenses to which the group of lenses are moved according to the temperature compensation data before corrected and second focusing positions of the group of lenses to which the group of the lenses are automatically moved from the first focusing positions to have the object the predetermined distance away imaged in focus based on the focus evaluation value under a condition under which a moving range of the group of lenses is restricted, when the system control section is on the third control mode, and
a temperature compensation data correction section for correcting the temperature compensation data to be used for the second control mode based on the correction coefficient calculated by the correction coefficient calculation section.

3. The imaging device as described in claim 2, wherein
the group of lenses comprises a focus lens to change a focus point and a zoom lens to change a magnification,
the storage section stores focal lens position trajectory data which are predetermined and indicate lens positions of the group of lenses for having an object imaged in focus,
the second control mode is a manual-focus trace control in which the focus lens is moved based on the focal lens position trajectory data for the predetermined distance to the object when the zoom lens is moved, and
the focal lens position trajectory data are corrected based the temperature compensation data corrected with the correction coefficient in the third mode.

4. The imaging device as described in claim 1, wherein
the system control section is changed to be on the correction mode if the zoom lens is positioned for a magnification larger than or equal to a predetermined magnification when the temperature change is larger than or equal to a predetermined temperature difference.

5. The imaging device as described in claim 1 further comprising an illumination intensity control section for detecting illumination intensity evaluation value corresponding to an illumination intensity of a taken image, wherein the system control section is changed to the correction mode if the illumination intensity evaluation value detected by the illumination intensity control section is larger than or equal to a predetermined illumination intensity when the temperature change is larger than or equal to a predetermined temperature difference.

6. The imaging device as described in claim 4,
wherein the system control section changes the moving range of the group of lenses according to the temperature compensation data and a optical properties of the group of lenses when the system control section is on the correction mode.

7. The imaging device as described in claim 6,
wherein the correction coefficient calculation section calculates the correction coefficient to correct the temperature compensation data if the focus evaluation value detected by the focus evaluation value detection section is larger than or equal to a predetermined evaluation value.

8. The imaging device as described in claim 7,
wherein the system control section has positions of the group of lenses stored in a non-volatile memory in the storage section.

9. The imaging device as described in claim 7,
wherein the system control section has the temperature information or the position of the group of lenses stored in a volatile memory in the storage section and has the temperature information or the position of the group of lenses stored in a non-volatile memory in the storage section a predetermined time after stored in the volatile memory.

10. The imaging device as described in claim 2,
wherein the system control section changes a wave height for moving the group of lenses according to on which of the first mode, the second mode and the third mode the system control section is.

* * * * *